United States Patent [19]
DaSilva

[11] Patent Number: 5,911,765
[45] Date of Patent: Jun. 15, 1999

[54] CONTROL PEDAL DISABLING DEVICE

[75] Inventor: Elias DaSilva, Jackson Heights, N.Y.

[73] Assignee: Scott D. Jacobson, Forest Hills, N.Y.

[21] Appl. No.: 08/984,714

[22] Filed: Dec. 3, 1997

[51] Int. Cl.[6] .................................................. F16H 57/00
[52] U.S. Cl. ................................. 70/202; 70/237; 70/199
[58] Field of Search ........................... 70/198–204, 209, 70/237, 238

[56] References Cited

U.S. PATENT DOCUMENTS

| | | | |
|---|---|---|---|
| 4,076,095 | 2/1978 | Adamski | 70/202 X |
| 4,779,435 | 10/1988 | Farrow | 70/199 X |
| 5,055,823 | 10/1991 | Fuller | 70/209 X |
| 5,094,092 | 3/1992 | Hsieh | 70/202 X |
| 5,259,222 | 11/1993 | Jang | 70/209 |
| 5,267,458 | 12/1993 | Heh | 70/199 X |
| 5,282,373 | 2/1994 | Riccitelli | 70/202 X |
| 5,329,793 | 7/1994 | Chen | 70/209 |
| 5,520,033 | 5/1996 | Holmberg et al. | 70/202 |
| 5,537,846 | 7/1996 | Simon | 70/202 |
| 5,598,725 | 2/1997 | Chang | 70/209 |
| 5,715,710 | 2/1998 | De Lucia et al. | 70/202 |
| 5,755,124 | 5/1998 | Chang | 70/209 |

FOREIGN PATENT DOCUMENTS

| | | | |
|---|---|---|---|
| 404709 | 12/1990 | European Pat. Off. | 70/202 |
| 1378580 | 10/1964 | France | 70/202 |
| 2419846 | 11/1979 | France | 70/202 |
| 1555688 | 4/1970 | Germany | 70/202 |
| 2043005 | 10/1980 | United Kingdom | 70/202 |
| 2091656 | 8/1982 | United Kingdom | 70/237 |
| 2255060 | 10/1992 | United Kingdom | 70/202 |

Primary Examiner—Suzanne Dino Barrett
Attorney, Agent, or Firm—Scott D. Jacobson, Esq.

[57] ABSTRACT

A vehicular control pedal disabling device having a base member, a generally U-shaped member extending upwardly from the base member, a structural housing through which the U-shaped member slides, and a means to lock the device. A means for producing light can be attached to the device to make it more noticeable to those outside of the vehicle. In the device's operable position, the U-shaped member and the structural housing surround the stem of the control pedal and prevent the pedal's actuation when the device is locked. In one embodiment the structural housing includes a support sleeve, a pedal restricting member, a first guide sleeve, a second guide sleeve and a connecting member. The first guide sleeve is connected to the support sleeve through the pedal restricting member and the first guide sleeve is parallel with the support sleeve. The second guide sleeve is axially aligned with the first guide sleeve so that the U-shaped member can slide through both the first and second guide sleeves.

In one embodiment the part of the housing has a projection and the U-shaped member has a mating groove. The projection-groove combination guides the U-shaped member.

12 Claims, 4 Drawing Sheets

CONTROL PEDAL DISABLING DEVICE

FIELD OF INVENTION

This invention relates generally to a vehicle anti-theft device and more particularly to a device that prevents the unauthorized actuation of one of the vehicle's control pedals.

BACKGROUND OF INVENTION

Motor vehicle theft has become an increasing problem, especially in large cities and the suburbs surrounding those cities. In an attempt to deter vehicle theft, many anti-theft devices have been developed. Some of these devices prevent an unauthorized user from driving the vehicle by locking one or more of the vehicle's control pedals. Existing devices may disable the clutch, the brake pedal, and/or the gas pedal to prevent an unauthorized person from operating the vehicle.

An anti-theft device's usefulness is largely a measure of the following characteristics: 1) the device's inability to be easily defeated; 2) the device's ease of use; 3) the device's adaptability to be used on a variety of vehicle models; 4) the cost of the device, which is often a measure of its complexity and/or the number of its component parts; 5) the device's visibility to those outside of the vehicle thereby deterring an attempted theft; and 6) the device's ease of storage.

Currently available control pedal devices have at least one deficiency that is solved by the present invention. For example, one type of device includes two slideably coupled members, wherein one member hooks around the steering wheel and the other member hooks around one of the control pedals. Locking the device prevents an unauthorized user from actuating the control pedal and turning the steering wheel. The device's deficiency is that it is easily defeated. An unauthorized user need only cut the rim of the steering wheel to disengage the device by merely pulling apart the two ends of the cut rim. The rim can be easily cut by a hacksaw or other cutting device. In contrast, the present invention locks a control pedal without attaching itself to the rim of the steering wheel. Also, the present invention is easier to use because it only needs to be attached to the control pedal rather than the control pedal and the steering wheel.

Another type of control pedal device is characterized by U.S. Pat. Nos. 5,094,092, issued to Hsieh, 4,700,555 issued to Robertson, Sr. et al., and 4,333,326, issued to Winters, all of which are incorporated herein for reference. These devices use a locking enclosure that surrounds the control pedal or the stem of the control pedal thereby preventing the control pedal's operation. The lock in these devices must be located near the control pedal, making it extremely difficult, if not impossible to lock the device from the driving position. These devices are also difficult to see from outside of the vehicle. In contrast, the present invention is much easier to apply since it allows a user to apply the device from the driving position. The present invention is also more visible because there is a structural member that extends upward from the control pedal, and in one embodiment, the upwardly extending member further includes a means for producing light.

There are devices that might be able to be applied from the seated position. U.S. Pat. Nos. 5,282,373, issued to Riccitelli ("Riccitelli"), and 5,537,846, issued to Simon ("Simon") are two such examples and are incorporated herein for reference. Riccitelli has two major disadvantages. Firstly, Riccitelli requires the user to manually adjust the height of the device by using a screwdriver or the like. This adjustment must be made so that the device fits snugly around the control pedal. The adjusted position is not permanently fixed, so the user will need to make future adjustments to properly use the device.

Second, Riccitelli can only be used on a limited number of vehicle models. Riccitelli uses a seat upon which the stem of the control pedal rests while the device is braced on the floor. The distance from the floor to the stem of the control pedal varies in different car models. As mentioned above, the user must use a screwdriver to adjust Riccitelli. By turning an adjusting screw (with the screwdriver), the user can cause the seat to move up or down thereby accommodating the differing control stem heights in various models. However, the range of motion for the seat is limited by the length of the internal adjusting screw, thereby limiting the variety of vehicles that can effectively use Riccitelli. Contrastingly, the present invention lacks the internal adjusting screw making it easier to implement, and the novel U-shaped design allows the device to be used on a wider range of vehicles.

Simon also contains several deficiencies. The user must first position bulky clamps around a control pad of the control pedal. After positioning the clamps around the brake pad, the user must extend the structure until it reaches the firewall. Then the user rotates an actuator to move one of the clamps to completely surround the brake pad. Lastly, the device is locked. Thus, Simon requires placing, extending, rotating and locking. The present invention requires fewer steps and is easier to use. The present invention only requires placing, releasing a sliding member, and then locking.

Simon requires many parts cooperating in a complicated way to achieve the desired result. This tends to make the device more expensive than the present invention, the present invention having significantly fewer parts. Lastly, the device is more difficult to store because of the protruding clamps and a cumbersome handle. In summary, the present invention is easier to use, contains fewer parts, is less complicated to manufacture and is stored more easily.

The present invention is directed to an anti-theft device that is at least as effective as presently available devices, is easy to use, is capable of cooperating with the greatest variety of vehicles, is inexpensive, highly visible, and easily stored.

SUMMARY OF THE INVENTION

In accordance with the present invention a pedal disabling device comprising a base member, a generally U-shaped member, a structural housing and a means for locking the device. The U-shaped member slides through the structural housing. The U-shaped member and structural housing form an enclosure that surrounds the stem of the control pedal. Optionally, the device may include a means for producing light. The device will function without the base member, but the device is most effective when utilizing a base member.

One embodiment of the structural housing includes a support sleeve, a pedal restricting member, a first guide sleeve, a second guide sleeve, and a connecting member. The pedal restricting member connects the first guide sleeve to the support sleeve while the connecting member connects the second guide sleeve to the support sleeve. The first and second guide sleeves are in axial alignment and are parallel to the support sleeve.

Alternatively, the second guide sleeve can be replaced by utilizing a support sleeve having a projection and the U-shaped member having a mating groove. The device will also function without the projection-groove arrangement and without the second guide sleeve, but it is not preferred.

In another alternative embodiment, the U-shaped member can be replaced by a first and second elongated members. The first elongated member slides through the support sleeve and the second elongated member slides through the first guide sleeve.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
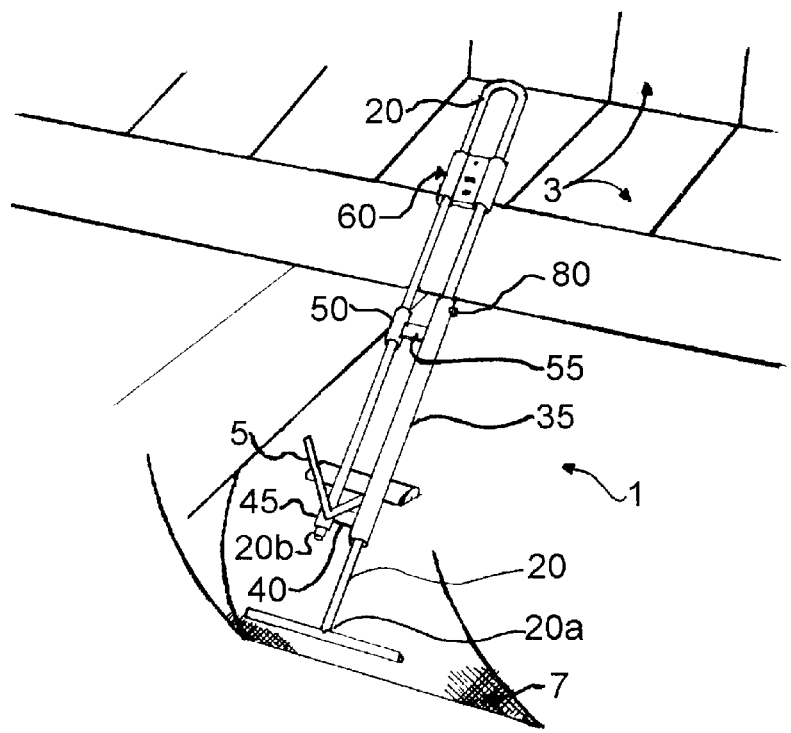
FIG. 1 is a perspective view of the preferred embodiment of the invention shown braced against the firewall of a vehicle and in relation to the driver's seat.

The control pedal disabling device 1 illustrated in FIG. 1 is shown in cooperation with a motor vehicle's brake pedal stem 5 and in relation to the vehicle's firewall 7 and driver's seat 3. All descriptions indicating direction (e.g., up, down, left or right) are based on using a driver in the seated position as the reference.

Components of the Device

The control pedal disabling device in FIG. 1 represents the best mode of the present invention. The device comprises a base member 10, a generally U-shaped member 20, a structural housing 30, a lock 80, and a light housing 60.

The base member 10 is shown as a rod that has a substantially circular cross-section. The shape of the base member 10 can be modified so long as it can be braced against the firewall or floor of the vehicle.

The generally U-shaped member 20 is welded, screwed or otherwise coupled to the base member 10 and extends upwardly from the base member 10 towards the driver. The U-shaped member 20 has a free-end 20b and a braced end 20a. The braced end 20a is the end that is coupled to the base member 10. The U-shaped member 20 has a first arm 22 and a second arm 24. The U-shaped member 20 has a substantially circular cross section, but it may have a differently shaped cross section.

It should be noted that the base member 10 is preferable, but not crucial for the device to operate. The braced end 20a of the U-shaped member 20 can be snugly braced against the floor or firewall of the vehicle thereby removing the need for the base member 10. If a base member 10 is not utilized, the braced end 20a of the U-shaped member could be capped with a relatively smooth material so that the braced end 20a does not cut or otherwise damage any carpeting on the floor or firewall. To avoid confusion, when the base member 10 is not utilized, the braced end 20a refers to that end of the U-shaped member that is braced against the floor or firewall.

Figure 2:
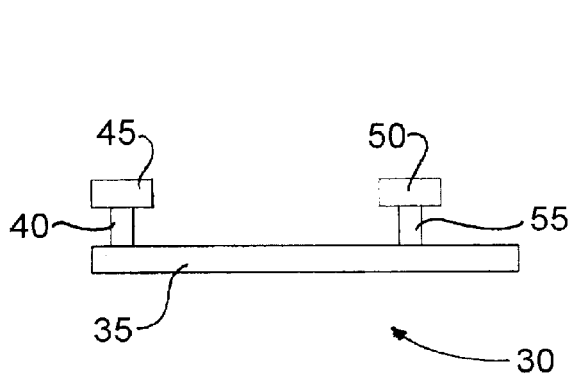
FIG. 2 is a plan view of the support structure of the preferred embodiment.

The structural housing 30 of the preferred embodiment, as shown in FIG. 2, includes a support sleeve 35, a pedal restricting member 40, a first guide sleeve 45, a second guide sleeve 50, and a connecting member 55. The support sleeve 35 is parallel to the first and second guide sleeves 45, 50. The first and second guide sleeves 45 and 50 are axially aligned to allow the free-end 20b of the U-shaped member 20 to slide through both guide sleeves. The pedal restricting member 40 is welded or otherwise coupled to the support sleeve 35 and to the first guide sleeve 45 thereby connecting the support sleeve 35 with the first guide sleeve 45. The connecting member 55 is welded or otherwise coupled to the support sleeve 35 and to the second guide sleeve 50 thereby connecting the support sleeve 35 with the second guide sleeve 50. The structural housing 30 along with the U-shaped member 20 form an enclosure that surrounds the stem 5 of a control pedal. In FIG. 1 the enclosure is defined by the support sleeve 35, the pedal restricting member 40, the first guide sleeve 45, a portion of the U-shaped member 20, the second guide sleeve 50 and the connecting member 55. The structural housing 30 may have alternative configurations so that when it is combined with the U-shaped member 20, the device surrounds the stem 5 of the control pedal and prevents its actuation.

Alternatively, the structural housing 30 could be manufactured as a single part or as a combination of parts fewer than all of those previously mentioned thereby sparing the need to couple all of the structural housing's 30 components. The structural housing 30, U-shaped member 20, and base member 10 should be made from steel or a similar alloy to prevent an unauthorized used from breaking the device.

Figure 4:
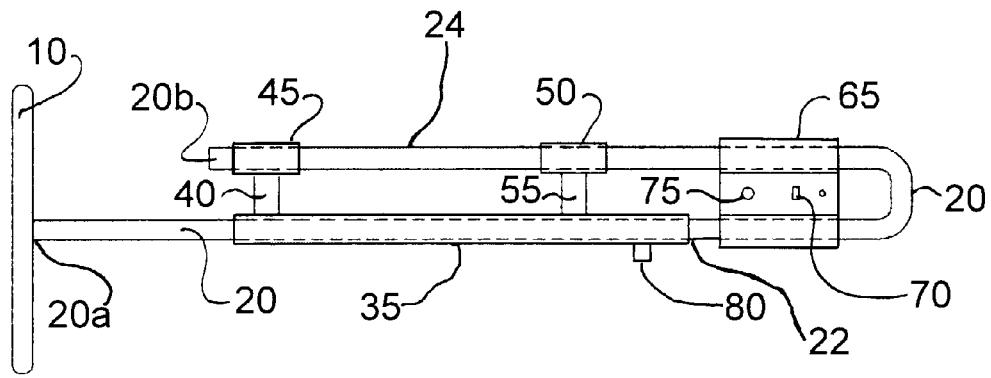
FIG. 4 is a plan view of the preferred embodiment in a closed position.
Figure 5:
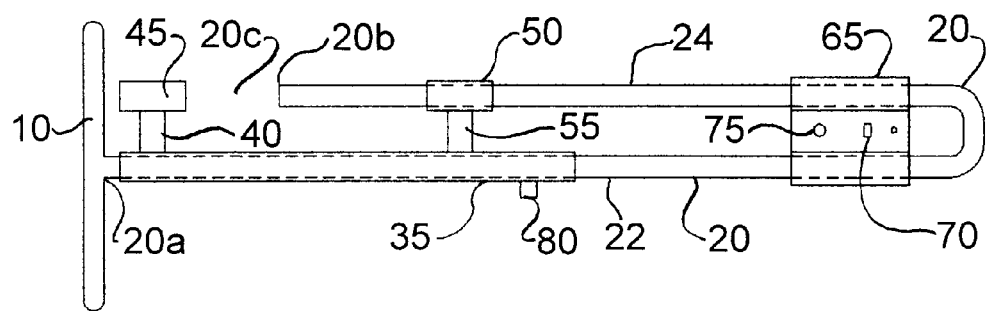
FIG. 5 is a plan view of the preferred embodiment in an open position that allows a user to slide the device around the stem of a control pedal.

FIGS. 1, 4, and 5 all show a lock 80 as a means for locking the device. The means for locking the device must substantially prevent relative motion between the structural housing 30 and the U-shaped member 20 to prevent the unauthorized removal of the device. FIG. 1 shows a lock that is located on an upper portion of the structural housing 30 which allows the user to lock the device while in a seated position. It should be realized that the lock can be placed anywhere on the device so long as it can prevent relative motion between the structural housing 30 and the U-shaped member 20. Various locks are known to those skilled in the art.

Figure 3:
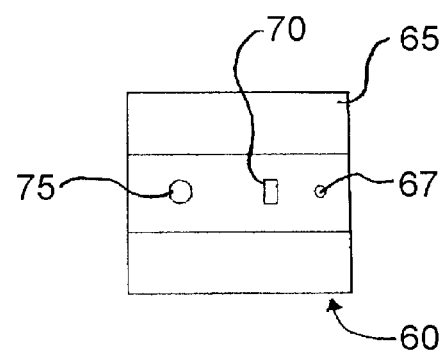
FIG. 3 is a plan view of the light housing used in the preferred embodiment.

FIGS. 1 and 3 show a light housing 60 as a means for producing light. FIG. 3 shows the light housing 60 in isolation. The light housing 60 includes a compartment 65, a switch 70, a light bulb 75 or light emitting diode, and a circuit to allow the user to turn on the light bulb 75 or light emitting diode with the switch 70. The compartment 65 houses a battery to energize the circuit when the switch 70 is moved to the "on" position. The light housing 60 can be mounted on the U-shaped member 20, and when done in accordance with FIG. 1, the light housing 60 also acts as a handle for the device. The light housing 60 is preferably made of plastic and can be manufactured as two pieces that snap together or are otherwise coupled around the U-shaped member 20. FIG. 3 shows a screw 67 or other means to fasten the two pieces together around the U-shaped member 20. A steady or flashing light can be used, and the light can be of any color. The light should be easily noticed by an unauthorized user from outside of the vehicle. The circuit and switch 70 are commonly known to those skilled in the art.

Operation of the Device

The user can apply the device from the seated position within the vehicle. Preferably, the brake pedal should be locked, but the device can be used to lock the clutch or gas pedal as well. Additionally, more than one device can be used or joined in such a way that allows more than one control pedal to be locked.

The user should place the base member 10 near the floor of the vehicle in the vicinity of the control pedal to be locked. While holding the structural housing 30 in a substantially fixed position, the user pulls the U-shaped member 20 upward towards the user, thereby drawing the base member 10 closer to the structural housing 30. FIGS. 4 and 5 show the relative position of the structural housing 30 with the base member 10 before and after pulling the U-shaped member 20 towards the structural housing 30. When the U-shaped member 20 is pulled upward, an opening 20c is created. The opening 20c is the entry point for the stem of the control pedal 5 that is being locked. The device is then placed around the stem of the control pedal 5 by sliding the device around the stem 5 via the opening 20c and placing the pedal restricting member 40 just below the stem of the control pedal 5. Once the device is slid around the stem of the control pedal 5 so that the opening 20c is on the right side of the stem 5, the user, while continuing to hold the structural housing 30 in a relatively stationary position, can push or simply release the U-shaped member 20, causing the free-end 20b of the U-shaped member 20 to move downward into the first guide sleeve 45 and close the opening 20c. The U-shaped member 20 slides downward until the base member 10 contacts the floor or firewall. The closed position refers to the position where the device is properly placed and the U-shaped member 20 is allowed to slide through the first guide sleeve 45 thereby closing the opening 20c. There is no need for the free-end 20b to protrude past the lower edge of the first guide sleeve so long as the opening 20c is closed. Since the pedal restricting member 40 is fixed to the structural housing 30, performing the above steps places the pedal restricting member 40 just below the stem of the control pedal while the base member 10 is braced against the floor or firewall. The user then needs only to lock the device to prevent the unauthorized removal of the device and to keep the control pedal locked in an unactuated position.

Figure 6:
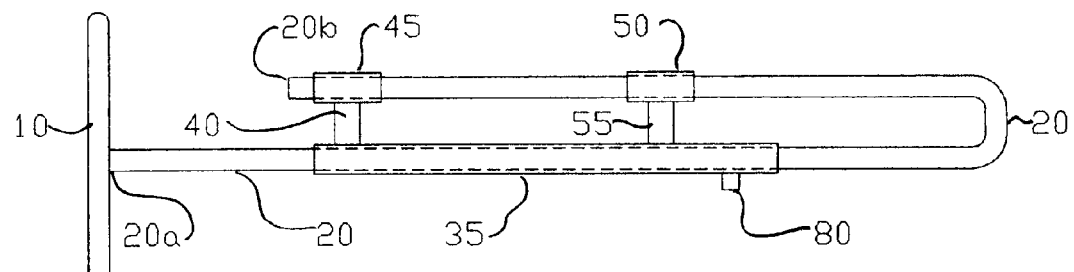
FIG. 6 is a plan view of a first alternative embodiment which lacks a means for producing light.

In FIG. 1, the device is locked by turning the key of the lock while the U-shaped member 20 is in the closed position. The user may then turn on the light bulb 75 to make the device easily noticed by people outside of the vehicle. In FIG. 1, the bulb 75 is lit by using the switch 70. Obviously the device will function without the means for producing light, as shown in FIG. 6, but the preferred embodiment includes the light housing 60 and all of its components because it will make the device more visible to an unauthorized user thereby deterring a theft attempt. Other means may be used to make the device more visible to people outside of the vehicle. For example, a glow-in-the-dark material can be fastened to the device to make it more visible at night, and this method, as well as others, is intended to be encompassed by the claim term "a means for producing light."

Figure 7:
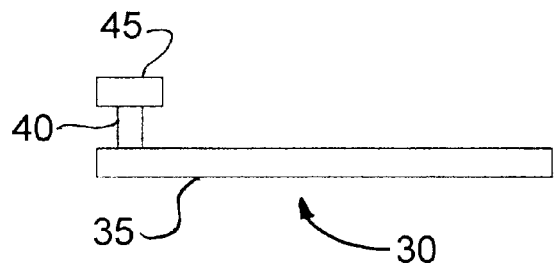
FIG. 7 Is plan view of a second alternative embodiment which uses only a single guide sleeve.
Figure 8:
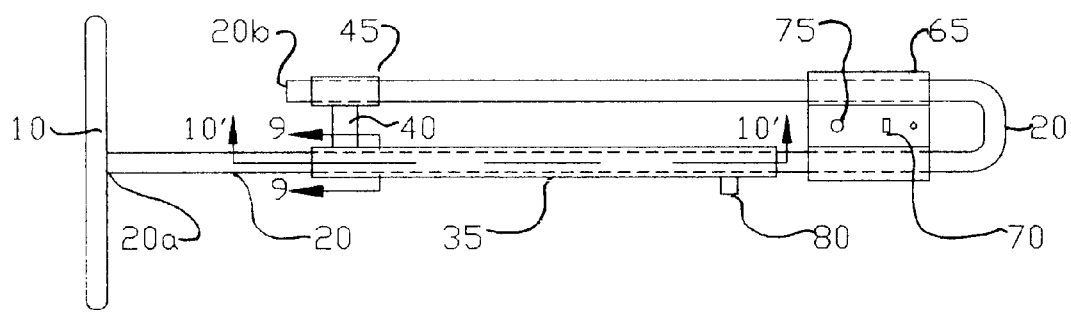
FIG. 8 is a plan view of a third alternative embodiment which uses a single guide sleeve with a projection and a groove.

Although the device has been described as preferably including first and second guide sleeves 45 and 50, the second guide sleeve 50 is not crucial for the device to function, as shown in FIGS. 7 and 8. When used, the second guide sleeve 50 is in axial alignment with the first guide sleeve 45 to allow the U-shaped member 20 to slide through both sleeves. Without the second guide sleeve 50 the free-end 20b of the U-shaped member 20 would be able to freely rotate about an axis defined by the support sleeve 35. Therefore, without the second guide sleeve 50, the user must manually align the free-end 20b of the U-shaped member 20 with the first guide sleeve 45 when releasing the U-shaped member 20 to reach the closed position. The user must insure that the free-end 20b of the U-shaped member 20 is aligned with the first guide sleeve 45 before it is released or pushed downward to close the opening 20c. Because this is an awkward and time consuming step, a second guide sleeve 50 is preferred. Additional guide sleeves may be used, and should be connected to the support sleeve 35 with the connecting member 55 or a supplemental connecting member (not shown).

Figure 9:
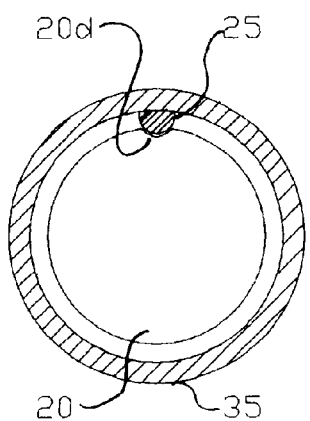
FIG. 9 is a cross-section of the third alternative embodiment taken along cut line 9—9 showing the relationship of the projection with the groove.
Figure 10:
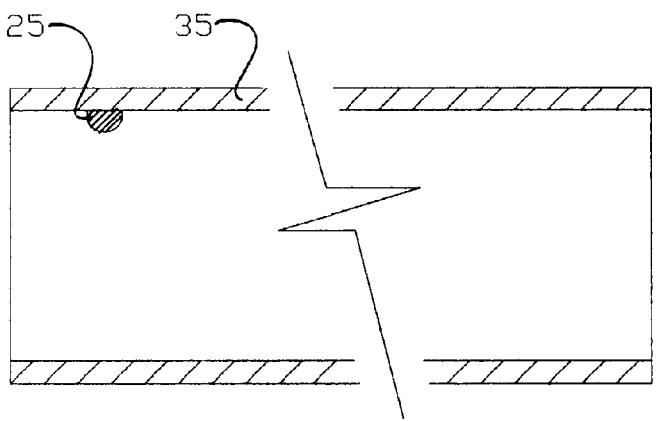
FIG. 10 is a cross-section of the third alternative embodiment taken along cut line 10'—10' showing the position of the projection.

A third alternative embodiment allows the user to easily slide the free-end 20b of the U-shaped member 20 through the first guide sleeve 45 without the need for the second guide sleeve 50. FIG. 9 shows the cross-section of the support sleeve 35 and U-shaped member 20 of this alternative embodiment. This alternative includes a support sleeve 35 having a projection 25 and a U-shaped member 20 having a guide groove 20d that mates with the projection 25. The guide groove 20d runs within a longitudinal portion of the U-shaped member 20. The guide groove 20d and the projection 25 must fit closely together to prevent relative rotation between the two, yet cooperate in such a way as to allow the U-shaped member 20 to slide easily through the support sleeve 35. The groove 20d and projection 25 must be positioned in a manner that aligns the free-end 20b of the U-shaped member 20 with the first guide sleeve 45 so that the free-end 20b can slide through the first guide sleeve 45. FIG. 10, a cross-sectional view of the support sleeve taken along 10'—10', shows that the projection 25 is preferably located near the bottom of the support sleeve 35.

Figure 11:
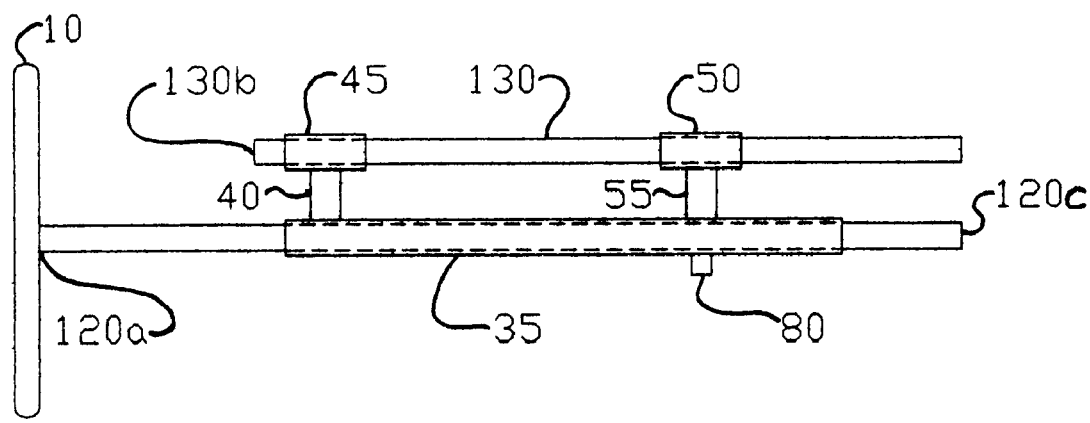
FIG. 11 is a plan view of a fourth alternative embodiment that replaces the U-shaped member with two separate elongated members.

A fourth alternative embodiment utilizes first and second elongated members 120, 130 instead of the U-shaped member 20. FIG. 11 shows this embodiment without a means for producing light. The first elongated member 120 has a braced end 120a which is coupled to the base member 10 and an upper end 120c. The first elongated member 120 slides through the support sleeve 35 of the structural housing 30. The second elongated member has an upper end 130c. The second elongated member 130 slides through the first and second guide sleeves 45, 50. The means for locking the device must prevent relative sliding between: 1) the first elongated member 120 and the support sleeve 35; and 2) the second elongated member 130 and the first and second guide sleeves 45, 50. The means for locking the device can utilize a mechanism that prevents the relative motion described above with a single keyturn. Aligning the lock 80 with the connecting member 55 is useful for that purpose, as shown in FIG. 11. The second elongated member 130 is not crucial for the device to operate if the first guide sleeve 45 is long enough to prevent removal of the device once it is locked. However, the second elongated member 130 is preferable as it will discourage unauthorized users from attempting to remove the device.

A means for producing light may still be added to the fourth alternative embodiment by using a light housing that is similar to the previously described light housing 60, but is mounted only to the first or second elongated members 120, 130 (not shown). The light housing can be mounted towards the upper ends of the first or second elongated members 120c, 130c.

Operating the fourth alternative embodiment is slightly different than the other embodiments. After placing the pedal restricting member 40 just below the control pedal to be disabled, the user must slide the first elongated member 120 downward until the base member 10 or braced end 120a reaches the firewall 7. Then, while holding these pieces relatively stationary, the user must slide the second elongated member 130 through the first and second guide sleeves 45, 50. Once the control pedal is surrounded by the support sleeve 35, pedal restricting member 40, first guide sleeve 45 and second elongated member 130, the user must lock the device. If the second elongated member 130 is not used with the device, the user needs only to place the pedal restricting member 40 just under the control pedal, slide the first elongated member 120 down until it is braced against the firewall 7 (while keeping the pedal restricting member 40 just under the control pedal) and lock the device.

This invention has been disclosed with specific reference to some preferred aspects of the same, but it is to be understood that modifications and/or changes can be introduced without departing from the spirit or scope of the present invention.

I claim:

1. A control pedal disabling device for a vehicle, comprising:
    a generally U-shaped member having a first arm and a second arm, the first arm having a braced end and the second arm having a free-end, wherein the braced end is braced against the vehicle's floor or firewall and the free-end is not in contact with the vehicle's floor or firewall when the device is in an operable position;
    a structural housing through which the U-shaped member slides, the structural housing having a support sleeve, a first guide sleeve parallel to the support sleeve, and a pedal movement restricting member coupled to both the support sleeve and the first guide sleeve, wherein the free-end is capable of sliding into the first guide sleeve; and
    a lock to substantially prevent relative motion between the U-shaped member and the structural housing.

2. The control pedal disabling device according to claim 1, further comprising a base member that is coupled with the braced end of the U-shaped member.

3. The control pedal disabling device according to claim 2, further comprising a means for producing light.

4. The control pedal disabling device according to claim 2, wherein the structural housing further comprises:
    a second guide sleeve, parallel to the support sleeve and in axial alignment with the first guide sleeve, so that the U-shaped member can slide through both the first and second guide sleeves; and
    a connecting member coupled to the support sleeve and to the second guide sleeve.

5. The control pedal disabling device according to claim 4 further comprising a means for producing light.

6. The control pedal disabling device according to claim 2, the structural housing having a projection and the U-shaped member having a groove which mates with the projection so that the U-shaped member is substantially prevented from rotating within the support sleeve.

7. The control pedal disabling device according to claim 6 further comprising a means for producing light.

8. A control pedal disabling device for a vehicle, comprising:
    a base member;
    a generally U-shaped member having a first arm and a second arm, the first arm having a braced end and the second arm having a free-end, wherein the braced end is coupled to the base member, wherein the base member is braced against the vehicle's floor or firewall when the device is in an operable position;
    a structural housing through which the U-shaped member slides, wherein the structural housing and the U-shaped member are configured to surround the stem of the control pedal to prevent actuation of the control pedal when the device is locked; and
    a lock to substantially prevent relative motion between the U-shaped member and the structural housing.

9. The control pedal disabling device according to claim 8 further comprising a means for producing light.

10. A control pedal disabling device comprising:
    a first elongated member having a braced end;
    a second elongated member having a free-end;
    a structural housing having a support sleeve and a first guide sleeve, wherein the first elongated member slides through the support sleeve and the second elongated member slides through the first guide sleeve, wherein the braced end is braced against the vehicle's floor or firewall when the device is in an operable position; and
    a lock to substantially prevent relative motion between the first and second elongated members and the structural housing.

11. The control pedal disabling device according to claim 10, further comprising a base member coupled to the braced end of the first elongated member.

12. The control pedal disabling device according to claim 10 further comprising a means for producing light.

* * * * *